US008934198B2

(12) United States Patent
Zou et al.

(10) Patent No.: US 8,934,198 B2
(45) Date of Patent: Jan. 13, 2015

(54) RECORDING HEAD INCLUDING NFT AND HEATSINK

(71) Applicant: Seagate Technology LLC, Cupertino, CA (US)

(72) Inventors: Jie Zou, Eden Prairie, MN (US); Kaizhong Gao, Eden Prairie, MN (US); William Albert Challener, Glenville, NY (US); Mark Henry Ostrowski, Lakeville, MN (US); Vankateswara Rao Inturi, Shakopee, MN (US); Tong Zhao, Eden Prairie, MN (US); Michael Christopher Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/062,651

(22) Filed: Oct. 24, 2013

(65) Prior Publication Data
US 2014/0050057 A1    Feb. 20, 2014

Related U.S. Application Data

(63) Continuation-in-part of application No. 13/928,445, filed on Jun. 27, 2013, now Pat. No. 8,670,215, which is a continuation of application No. 13/678,017, filed on Nov. 15, 2012, now Pat. No. 8,477,454, which is a continuation of application No. 13/032,673, filed on Feb. 23, 2011, now Pat. No. 8,339,740, said application No. 14/062,651 is a continuation-in-part of application No. 13/795,643, filed on Mar. 12, 2013.

(60) Provisional application No. 61/307,129, filed on Feb. 23, 2010, provisional application No. 61/637,979, filed on Apr. 25, 2012.

(51) Int. Cl.
*G11B 5/02*    (2006.01)

(52) U.S. Cl.
USPC ........................................... 360/125.31

(58) Field of Classification Search
USPC ........................................... 360/125.31
See application file for complete search history.

(56) References Cited

U.S. PATENT DOCUMENTS

| 6,795,630 | B2 | 9/2004 | Challener | |
|---|---|---|---|---|
| 6,999,384 | B2 | 2/2006 | Stancil | |
| 7,002,228 | B2 * | 2/2006 | Deak et al. | 257/421 |
| 7,032,427 | B2 | 4/2006 | Niwa | |
| 7,262,936 | B2 * | 8/2007 | Hamann et al. | 360/128 |

(Continued)

OTHER PUBLICATIONS

PCT/US2013/038120 Search Report and Written Opinion dated Jul. 19, 2013, (8 pgs).

(Continued)

*Primary Examiner* — Mark Blouin
(74) *Attorney, Agent, or Firm* — Mueting, Raasch & Gebhardt, P.A.

(57) ABSTRACT

An apparatus including a near field transducer positioned adjacent to an air bearing surface, the near field transducer comprising silver (Ag) and at least one other element or compound; a first magnetic pole; and a heat sink positioned between the first magnetic pole and the near field transducer, wherein the heat sink includes: rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

20 Claims, 12 Drawing Sheets

(56) References Cited

U.S. PATENT DOCUMENTS

| | | |
|---|---|---|
| 7,272,079 B2 | 9/2007 | Challener |
| 7,330,404 B2 | 2/2008 | Peng |
| 7,791,839 B2 * | 9/2010 | Olson et al. .............. 360/125.31 |
| 7,961,417 B2 | 6/2011 | Seigler |
| 8,040,761 B2 | 10/2011 | Kawamori |
| 8,077,556 B2 | 12/2011 | Komura |
| 8,116,034 B2 * | 2/2012 | Komura et al. .......... 360/125.31 |
| 8,116,176 B2 | 2/2012 | Kato |
| 8,213,272 B2 | 7/2012 | Takayama |
| 8,223,597 B2 | 7/2012 | Komura |
| 8,284,521 B2 | 10/2012 | Ohtsu |
| 8,284,635 B2 | 10/2012 | Matsumoto |
| 8,477,454 B2 | 7/2013 | Zou |
| 2005/0190496 A1 | 9/2005 | Hamann |
| 2007/0069383 A1 | 3/2007 | Suzuki |
| 2009/0073858 A1 | 3/2009 | Seigler |
| 2009/0130365 A1 | 5/2009 | Kojima |
| 2010/0103553 A1 | 4/2010 | Shimazawa |
| 2010/0123965 A1 | 5/2010 | Lee |
| 2010/0128579 A1 | 5/2010 | Seigler |
| 2010/0149930 A1 | 6/2010 | Komura |
| 2010/0214685 A1 | 8/2010 | Seigler |
| 2010/0309581 A1 | 12/2010 | Wu |
| 2011/0038236 A1 | 2/2011 | Mizuno |
| 2011/0058272 A1 | 3/2011 | Miyauchi |
| 2011/0122735 A1 | 5/2011 | Kato |
| 2011/0205863 A1 | 8/2011 | Zhao |
| 2012/0105996 A1 | 5/2012 | Katine |
| 2012/0127839 A1 | 5/2012 | Rawat |
| 2013/0107679 A1 | 5/2013 | Huang |
| 2013/0235707 A1 | 9/2013 | Zhao et al. |

OTHER PUBLICATIONS

Bannuru et al., "The Electrical and Mechanical Properties of Au-V and Au-V2O5 Thin Films for Wear-Resistant RF MEMS Switches", *Journal of Applied Physics*, 103, (2008), pp. 083522-1-083522-6.

Williams et al., "Strengthening Gold Thin Films with Zirconia Nanoparticles for MEMS Electrical Contacts", *ScienceDirect*, Acta Materialia 56, (2008), pp. 1813-1819.

\* cited by examiner

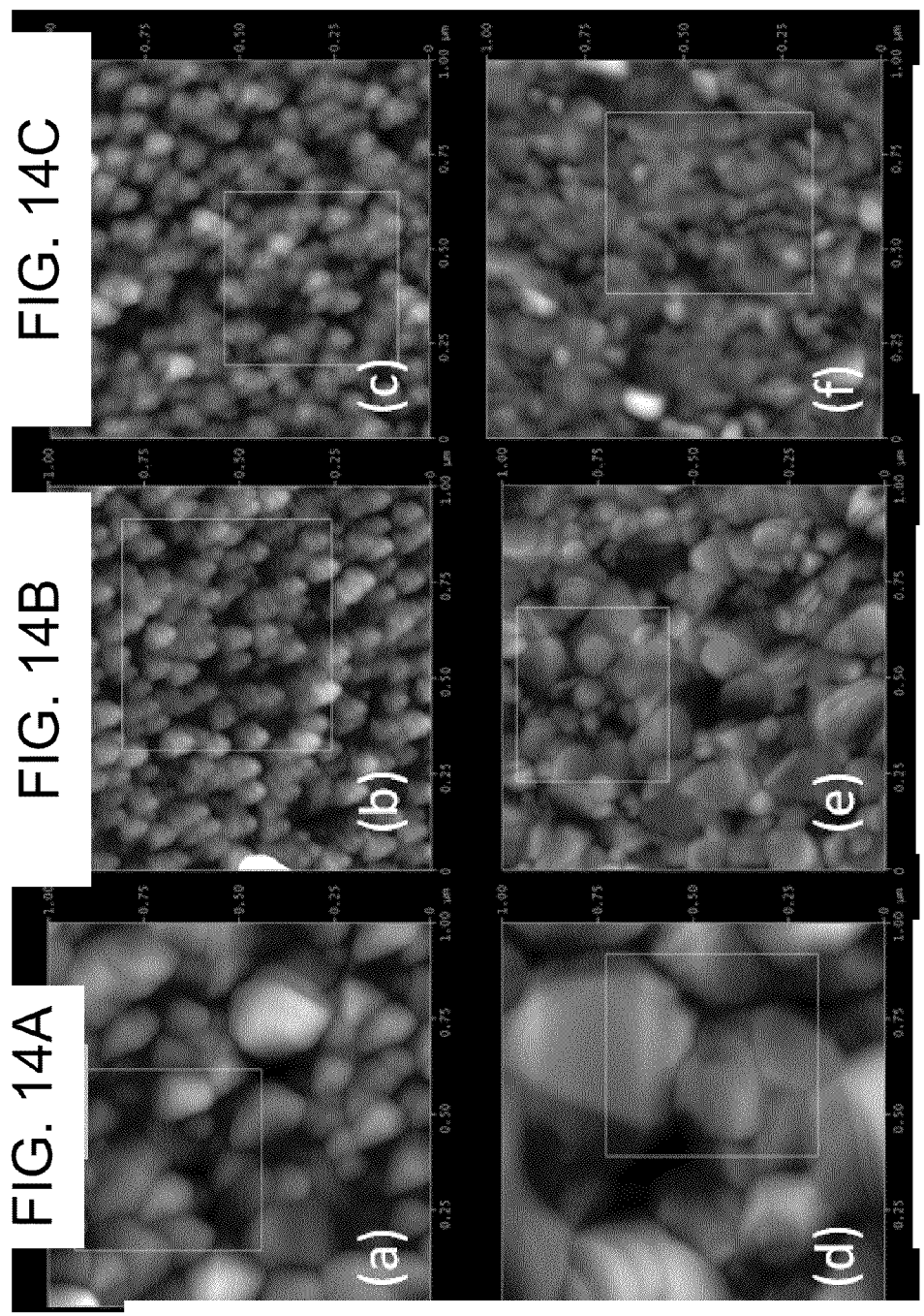

RECORDING HEAD INCLUDING NFT AND HEATSINK

This application is a continuation-in-part of: U.S. patent application Ser. No. 13/928,445 filed Jun. 27, 2013, which is a continuation of U.S. patent application Ser. No. 13/678,017, filed Nov. 15, 2012, now U.S. Pat. No. 8,477,454, which is a continuation of U.S. patent application Ser. No. 13/032,673, filed Feb. 23, 2011, now U.S. Pat. No. 8,339,740, which claims the benefit of U.S. Provisional Patent Application No. 61/307,129, filed Feb. 23, 2010, and titled "Diffusion Barrier For HAMR Head Between NFT And Writer (Recording Head For Heat Assisted Magnetic Recording)"; and U.S. patent application Ser. No. 13/795,643 which claims the benefit of U.S. Provisional Patent Application No. 61/637,979 and titled "HAMR NFT Materials with Improved Thermal Stability", the disclosures of which are incorporated herein by reference thereto.

SUMMARY

An apparatus including a near field transducer positioned adjacent to an air bearing surface, the near field transducer including silver (Ag) and at least one other element or compound; a first magnetic pole; and a heat sink positioned between the first magnetic pole and the near field transducer, wherein the heat sink includes: rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

An apparatus including a near field transducer positioned adjacent to an air bearing surface, the near field transducer including silver (Ag) and at least one other element or compound; a first magnetic pole; a heat sink positioned between the first magnetic pole and the near field transducer, and a diffusion barrier positioned between the near field transducer and the first magnetic pole, the diffusion barrier including: rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

An apparatus including a near field transducer positioned adjacent to an air bearing surface, the near field transducer including silver (Ag) and at least one other element or compound, wherein the at least one other element or compound is selected from: copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof; oxides of V, Zr, Mg, calcium (Ca), Al, Ti, Si, cesium (Ce), yttrium (Y), Ta, W or thorium (Th), Co, or combinations thereof; or nitrides of Ta, Al, Ti, Si, indium (In), Fe, Zr, Cu, W, boron (B), halfnium (Hf), or combinations thereof; a first magnetic pole; and a heat sink positioned between the first magnetic pole and the near field transducer, wherein the heat sink includes rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

An apparatus including a near field transducer positioned adjacent to an air bearing surface of the apparatus the near field transducer including silver (Ag) and at least one other element or compound, wherein the at least one other element or compound is selected from: copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof; oxides of V, Zr, Mg, calcium (Ca), Al, Ti, Si, cesium (Ce), yttrium (Y), Ta, W or thorium (Th), Co, or combinations thereof; or nitrides of Ta, Al, Ti, Si, indium (In), Fe, Zr, Cu, W, boron (B), halfnium (Hf), or combinations thereof, and wherein the near field transducer includes a disk and a peg, wherein the peg extends from the disk portion to the air bearing surface of the apparatus; a first magnetic pole; a heat sink positioned between the first magnetic pole and the near field transducer; and a diffusion barrier positioned between the near field transducer and the heat sink, the diffusion barrier including rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

An apparatus including a near field transducer positioned adjacent to an air bearing surface, the near field transducer including silver (Ag) and at least one other element or compound, wherein the at least one other element or compound is selected from: copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof; oxides of V, Zr, Mg, calcium (Ca), Al, Ti, Si, cesium (Ce), yttrium (Y), Ta, W or thorium (Th), Co, or combinations thereof; or nitrides of Ta, Al, Ti, Si, indium (In), Fe, Zr, Cu, W, boron (B), halfnium (Hf), or combinations thereof, and wherein the near field transducer comprises an antenna; a first magnetic pole; a heat sink positioned between the first magnetic pole and the near field transducer; and a diffusion barrier positioned between the near field transducer and the first magnetic pole, the diffusion barrier comprising rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIGS. 14A to 14F are atomic force microscopy (AFM) images (1 µm×1 µm scans) of Ag and AgPd films, with FIG. 14A being an AFM image of an as-deposited Ag film; FIG. 14B an as-deposited AgPd (10.7 at % Pd) film; FIG. 14C an as-deposited AgPd (25 at %) film; FIG. 14D a Ag film after a 300° C. 15 minute rapid thermal annealing (RTA); FIG. 14E a AgPd (10.7 at %) film after a 300° C. 15 minute RTA; and FIG. 14 a AgPd (25 at %) film after a 300° C. 15 minute RTA.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
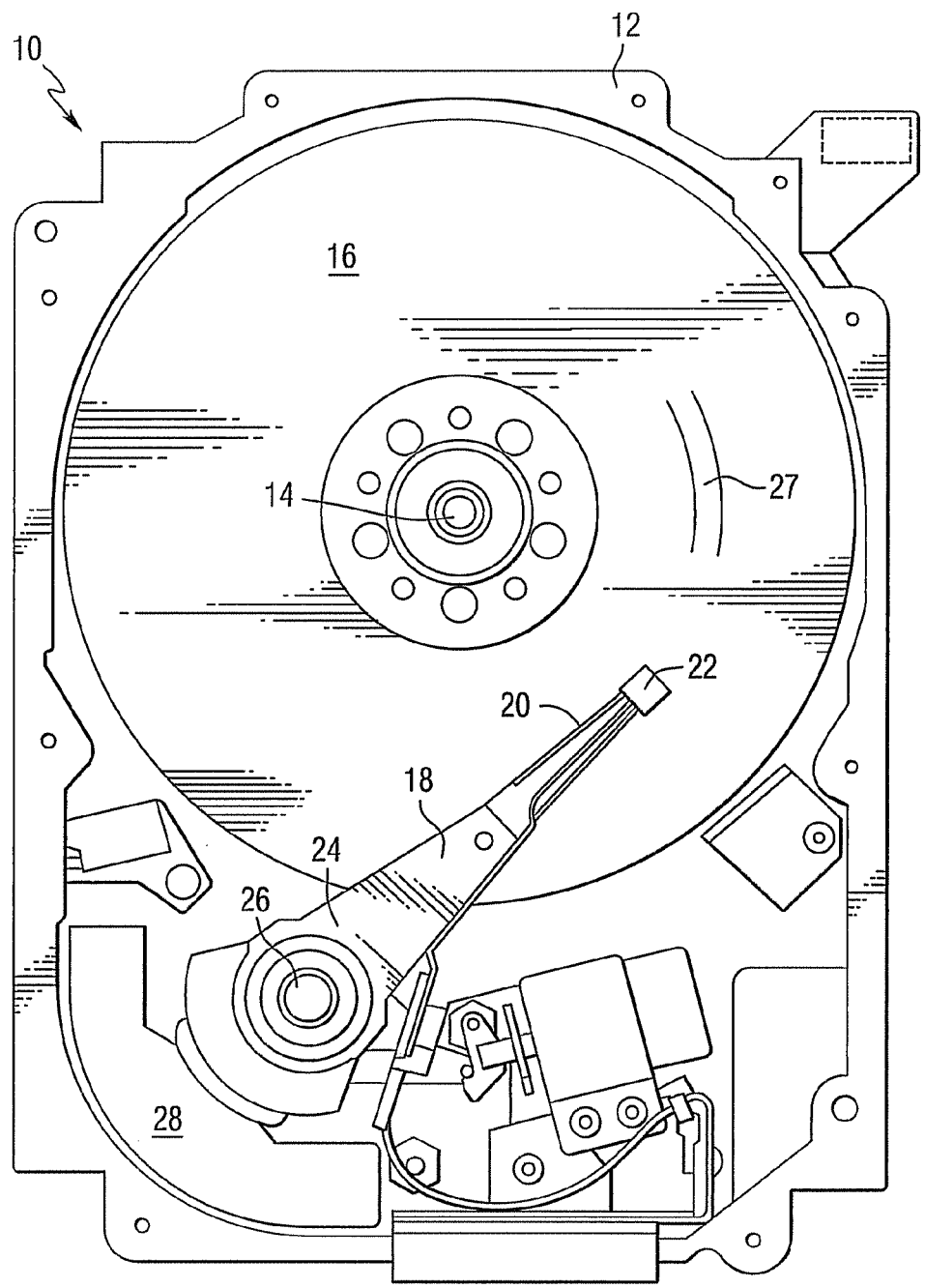
FIG. 1 is a pictorial representation of a data storage device in the form of a disc drive that can include a recording head constructed in accordance with an aspect of this disclosure.

FIG. 1 is a pictorial representation of a data storage device in the form of a disc drive 10 that can utilize recording heads constructed in accordance with various aspects of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. While FIG. 1 shows a disc drive, the invention can be applied to other devices that include a transducer and a storage media, wherein the storage media is heated to facilitate switching of bits in the storage media.

Figure 2:
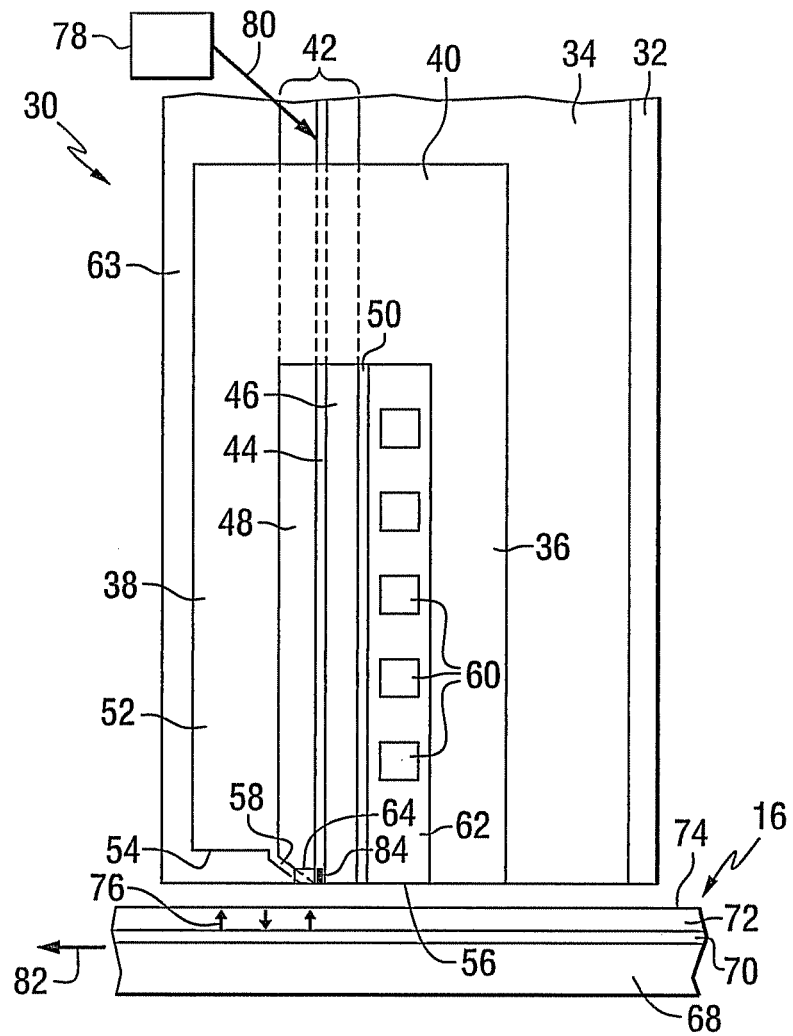
FIG. 2 is a side elevation view of a recording head constructed in accordance with an aspect of the disclosure.

FIG. 2 is a side elevation view of a recording head constructed in accordance with an aspect of the disclosure, and positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material such as, for example, Au.

As illustrated in FIG. 2, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near field transducer (NFT) 84 is positioned in or adjacent to the waveguide and at or near the air bearing surface. The heat sink material may be chosen such that it does not interfere with the resonance of the NFT. In various embodiments, the near field transducer can take the form of an antenna. FIGS. 10, 11, 13 and 14 show the shapes of several different embodiments of the NFT 276, 278, 280 and 282 as viewed from the air bearing surface.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Elements in structures surrounding the NFT, such as the magnetic write pole and dielectric layers, can diffuse into the NFT through the NFT heat sink during operation when the NFT is at elevated temperatures. This can potentially degrade the optic properties of the plasmonic materials in the NFT and reduce the coupling efficiency. Furthermore, plasmonic materials in the NFT can also diffuse into the surrounding structures such as magnetic write pole and dielectric layers, degrading the magnetic properties of the write pole and the optical properties of the dielectric layers.

In one aspect, the disclosure provides a HAMR NFT design with improved reliability. A diffusion barrier is included to limit the diffusion of pole materials into the NFT. This design also lowers the NFT temperature.

Figure 3:
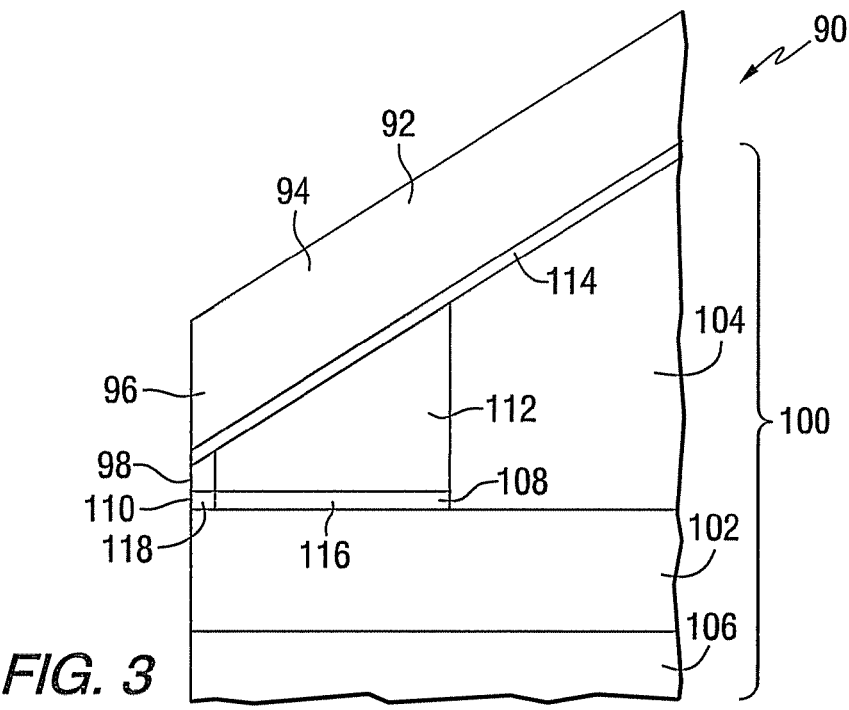
FIG. 3 is a cross-sectional view of a portion of a recording head constructed in accordance with an aspect of the disclosure.

In one embodiment, a diffusion barrier is positioned between the pole and NFT. This embodiment is illustrated in FIG. 3, which is an enlarged view of a portion of a magnetic recording head 90. The recording head includes a magnetic pole 92 that can be made of CoFe, and includes a sloped portion 94 having an end 96 positioned adjacent to an air bearing surface 98. The head further includes a waveguide 100 having a core layer 102 sandwiched between first and second cladding layers 104 and 106. A near field transducer 108 is positioned adjacent to the core layer and has an end 110 positioned adjacent to the air bearing surface. A heat sink 112 is positioned between the NFT and the pole. A diffusion barrier layer 114 is positioned between the magnetic pole and the heat sink. The diffusion barrier limits the diffusion of pole materials into the NFT. The diffusion barrier also doubles as a seed layer for the plating of the CoFe pole. The NFT can be a lollipop design having a disk portion 116 and a peg 118 that extends from the disk portion to the air bearing surface. The heat sink is positioned between the disk portion and the magnetic pole.

Figure 4:
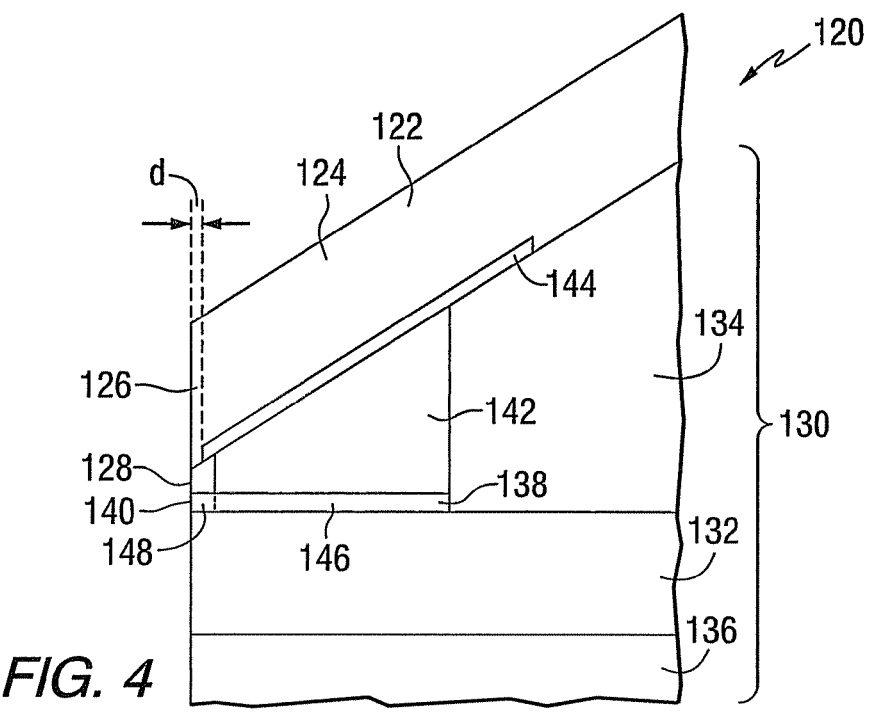
FIG. 4 is a cross-sectional view of a portion of a recording head constructed in accordance with another aspect of the disclosure.

FIG. 4 is a cross-sectional view of a portion of another recording head 120 constructed in accordance with another aspect of the disclosure. The recording head includes a magnetic pole 122 that can be made of CoFe, and includes a sloped portion 124 having an end 126 positioned adjacent to an air bearing surface 128. The head further includes a waveguide 130 having a core layer 132 sandwiched between first and second cladding layers 134 and 136. A near field transducer 138 is positioned adjacent to the core layer and has an end 140 positioned adjacent to the air bearing surface. A heat sink 142 is positioned between the NFT and the pole. A diffusion barrier layer 144 is positioned between the magnetic pole and the heat sink. The diffusion barrier limits the diffusion of pole materials into the NFT. The NFT can be a lollipop design having a disk portion 146 and a peg 148 that extends from the disk portion to the air bearing surface. The heat sink is positioned between the disk portion and the magnetic pole. In this example, the diffusion barrier layer does not extend to the air bearing surface, but rather is spaced from the air bearing surface by a distance d.

In the design of FIG. 3, the addition of the diffusion barrier 114 increases the NFT-to-pole spacing (NPS). Since a small NPS may be desirable for HAMR recording, the designs of FIG. 3 may impose a limitation on the diffusion barrier thickness. The embodiment of FIG. 4 removes this limitation. In FIG. 4, the diffusion barrier is patterned to be recessed from ABS. Thus, the NPS does not include the diffusion barrier in the region near the air bearing surface and the NPS can be reduced.

Figure 5:
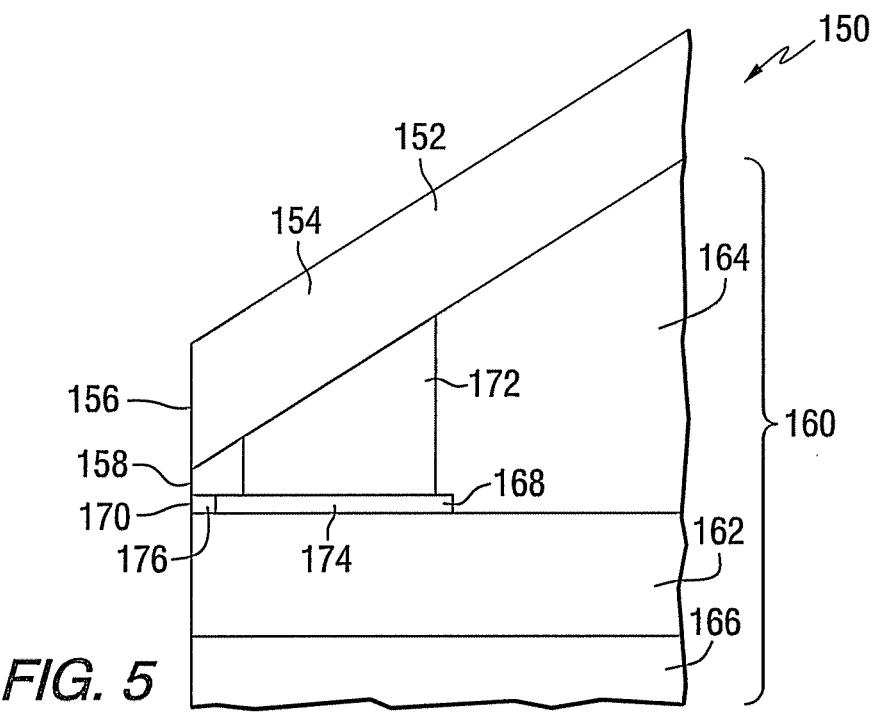
FIG. 5 is a cross-sectional view of a portion of another recording head constructed in accordance with another aspect of the disclosure.

FIG. 5 is a cross-sectional view of a portion of another recording head 150 constructed in accordance with an aspect of the disclosure. The recording head includes a magnetic pole 152 that can be made of CoFe, and includes a sloped portion 154 having an end 156 positioned adjacent to an air bearing surface 158. The head further includes a waveguide 160 having a core layer 162 sandwiched between first and second cladding layers 164 and 166. A near field transducer 168 is positioned adjacent to the core layer and has an end 170 positioned adjacent to the air bearing surface. A heat sink 172 is positioned between the NFT and the pole. In this example, the heat sink is made of a material that also serves as a diffusion barrier. The diffusion barrier limits the diffusion of pole materials into the NFT. The NFT can be a lollipop design having a disk portion 174 and a peg 176 that extends from the disk portion to the air bearing surface. The heat sink is positioned between the disk portion and the magnetic pole.

In the FIG. 5 embodiment, the heat sink uses the diffusion barrier material, instead of the same plasmonic material as the NFT. The heat sink acts as the diffusion barrier between the write pole and the NFT, as well as a heat sink. Example materials and material properties are described below. As such, the materials indicated as those that can be used in the diffusion barrier below can be used as the heat sink in the embodiment depicted in FIG. 5 (and similar embodiments).

Figure 6:
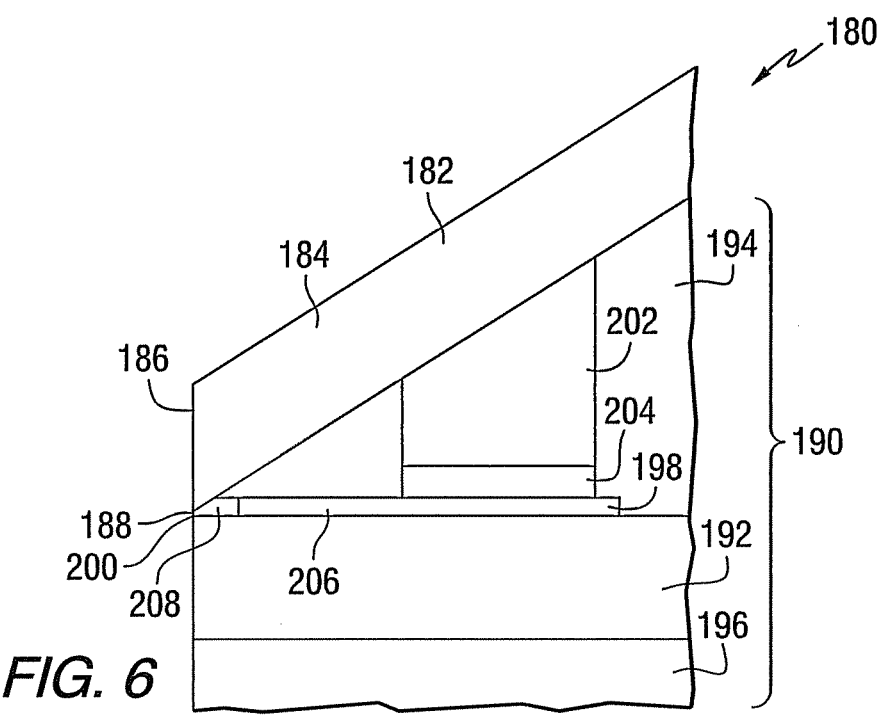
FIG. 6 is a cross-sectional view of another recording head constructed in accordance with another aspect of the disclosure.

FIG. 6 is a cross-sectional view of another recording head 180 constructed in accordance with an aspect of the disclosure. The recording head includes a magnetic pole 182 that can be made of CoFe, and includes a sloped portion 184 having an end 186 positioned adjacent to an air bearing surface 188. The head further includes a waveguide 190 having a core layer 192 sandwiched between first and second cladding layers 194 and 196. A near field transducer 198 is positioned adjacent to the core layer and has an end 200 positioned adjacent to the air bearing surface. A heat sink 202 is positioned between the NFT and the pole. A diffusion barrier layer 204 is positioned between the NFT and the heat sink. The diffusion barrier limits the diffusion of pole materials into the NFT. The NFT can be a lollipop design having a disk portion 206 and a peg 208 that extends from the disk portion to the air bearing surface. The diffusion barrier layer is positioned between the disk portion and the heat sink. In the embodiment of FIG. 6, the heat sink has a bi-layer structure, where the bottom part is the diffusion barrier while the upper part still uses Au. For a similar bi-layer structure, the material order can be reversed, where the bottom part is the plasmonic material such as Au and the upper part is the diffusion barrier material. Such a bi-layer structure can also be repeated to form multi-layer structure.

Figure 7:
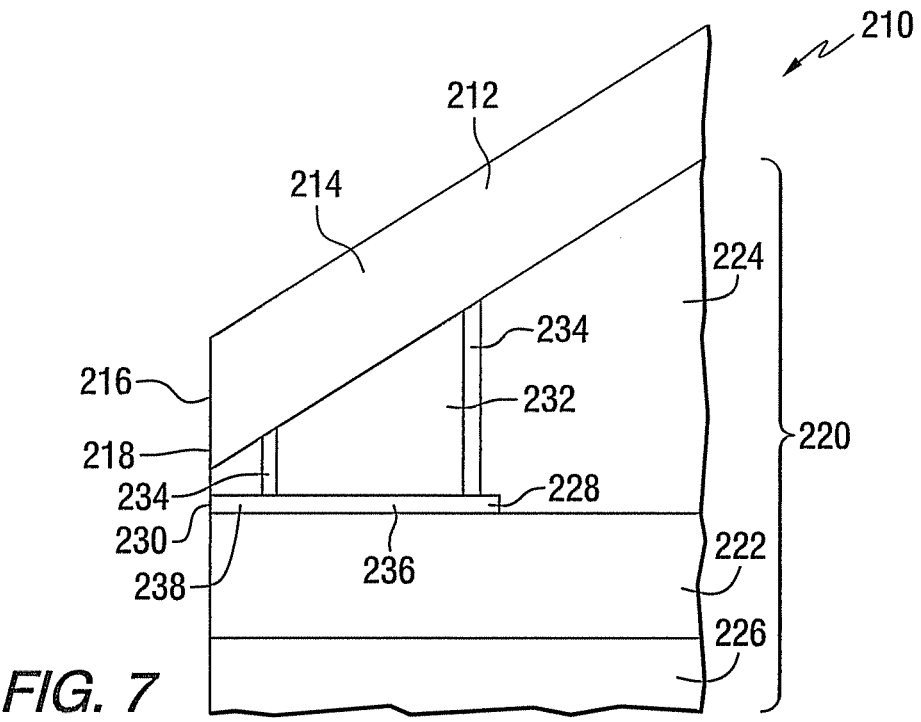
FIG. 7 is a cross-sectional view of another recording head constructed in accordance with another aspect of the disclosure.

FIG. 7 is a cross-sectional view of another multilayer recording head 210 constructed in accordance with an aspect of the disclosure. The recording head includes a magnetic pole 212 that can be made of CoFe, and includes a sloped portion 214 having an end 216 positioned adjacent to an air bearing surface 218. The head further includes a waveguide 220 having a core layer 222 sandwiched between first and second cladding layers 224 and 226. A near field transducer 228 is positioned adjacent to the core layer and has an end 230 positioned adjacent to the air bearing surface. A heat sink 232 is positioned between the NFT and the pole. A diffusion barrier layer 234 is positioned around the heat sink. The diffusion barrier limits the diffusion of waveguide cladding materials into the NFT. The NFT can be a lollipop design having a disk portion 236 and a peg 238 that extends from the disk portion to the air bearing surface. In the embodiment of FIG. 7, a diffusion barrier shell is positioned outside the NFT heat sink, to provide protection against potential diffusion or reaction between the NFT heat sink and surrounding clad layer. One additional benefit of this embodiment is the potential enhanced adhesion between the heat sink and clad layers.

Figure 8:
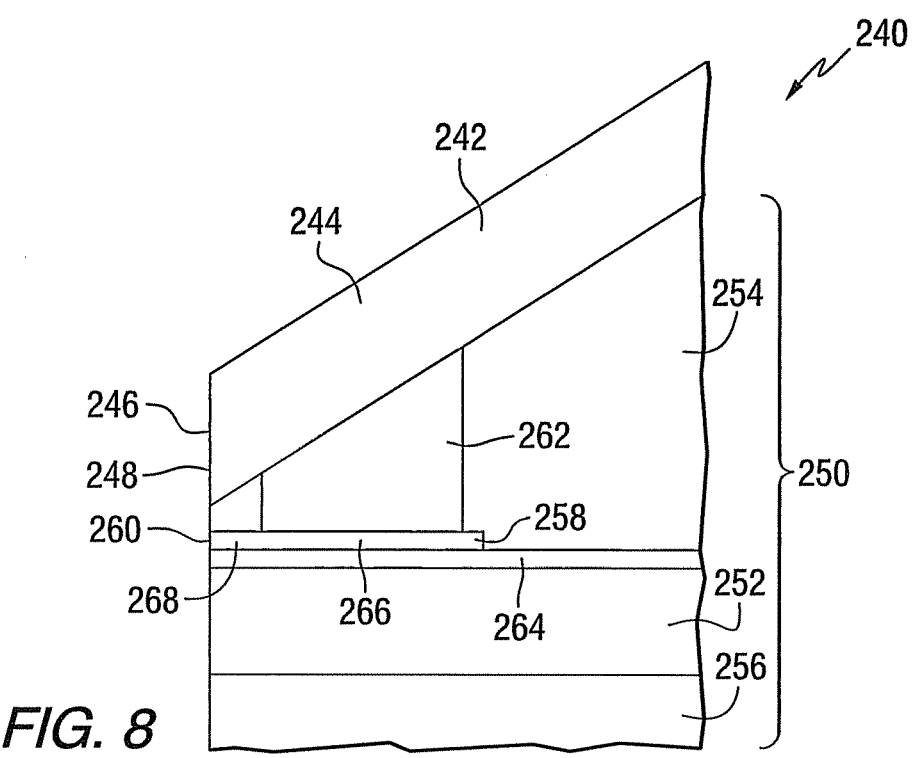
FIG. 8 is a cross-sectional view of another recording head constructed in accordance with another aspect of the disclosure.

FIG. 8 is a cross-sectional view of another recording head 240 constructed in accordance with an aspect of the disclosure. The recording head includes a magnetic pole 242 that can be made of CoFe, and includes a sloped portion 244 having an end 246 positioned adjacent to an air bearing surface 248. The head further includes a waveguide 250 having a core layer 252 sandwiched between first and second cladding layers 254 and 256. A near field transducer 258 is positioned adjacent to the core layer and has an end 260 positioned adjacent to the air bearing surface. A heat sink 262 is positioned between the NFT and the pole. A diffusion barrier layer 264 is positioned between the NFT and the core layer. The diffusion barrier limits the diffusion of core layer material into the NFT. The NFT can be a lollipop design having a disk portion 266 and a peg 268 that extends from the disk portion to the air bearing surface. In the embodiment of FIG. 8, a diffusion barrier is added under the NFT, to provide protection against diffusion between the plasmonic material of the NFT and the core or cladding layer under the NFT. One additional benefit of this embodiment is the potential enhanced adhesion of the NFT on the core or cladding layer underneath.

Other embodiments can include various combinations of the features of the embodiments of FIGS. 3-8.

Figure 9:
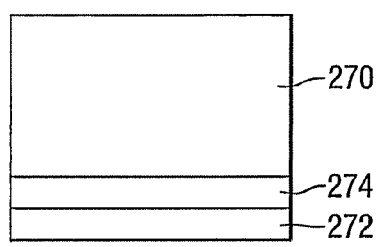
FIG. 9 is a plan view of a portion of an air bearing surface of a recording head.
Figure 10:
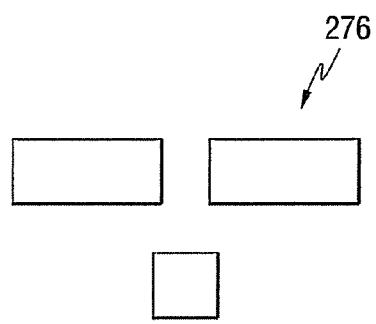
FIGS. 10-13 are schematic representations of near field transducers.
Figure 11:
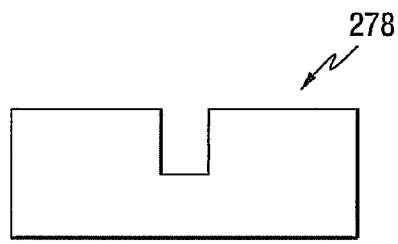
Figure 12:
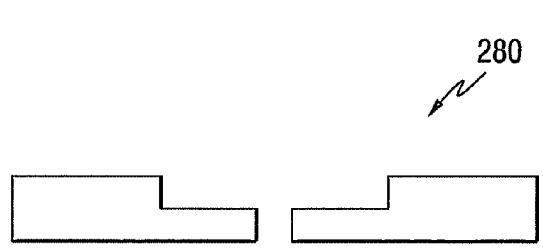
Figure 13:
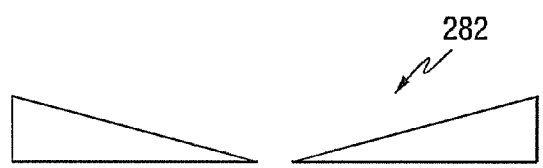

The disclosure is not limited to the embodiments of FIGS. 3-8. For a more generalized case, the HAMR head basic structure will include: a transducer with a plasmonic metallic layer, a metallic layer and a ferromagnetic metallic layer, where the center layer is preferred to be a non-magnetic, non-plasmonic layer. FIG. 9 is an air bearing surface view of a magnetic pole 270 separated from a plasmonic material NFT 272 by a non-magnetic, non-plasmonic material 274.

While certain materials are set forth above in the described embodiments, it should be understood that other materials can be used in place of the materials described in the particular embodiments. The specific materials used can be chosen in accordance with the following criteria. In one embodiment, the diffusion percentage between the plasmonic material and the non-magnetic, non-plasmonic layer may be less than 2% at 400° C. and the diffusion percentage between the non-magnetic, non-plasmonic layer and the NFT may be less than 2% at 400° C. Materials for the diffusion barrier should have very low solubility in the plasmonic NFT materials. Furthermore, the materials should have good thermal conductivity, so that heat can be efficiently dissipated.

In some embodiments, diffusion barrier materials can include, for example, rhodium (Rh) and its alloys; ruthenium (Ru) and its alloys; titanium (Ti), and its alloys; tantalum (Ta), and its alloys; tungsten (W) and its alloys; borides; nitrides; transition metal oxides; and palladium (Pd) and its alloys. Exemplary Ti alloys can include, for example TiC, TiN, TiCN, TiPd, and $Ti_3Pd$. Exemplary Ta alloys can include, for example TaC, TaN, and TaCN. Exemplary W alloys can include, for example WN, WCN, WTi, and WTiN. Exemplary borides can include, for example, $ZrB_2$, $TiB_2$, $HfB_2$, $MgB_2$, and $VB_2$. Exemplary nitrides can include, for example TaN, and TiN. In some embodiments, diffusion barrier materials can include nickel phosphorus (NiP).

Since magnetic materials generally have relatively poor thermal conductivity, the addition of a better thermally conductive diffusion barrier may dissipate heat better and lower the NFT temperature. This may further improve the NFT reliability. In some embodiments, the plasmonic NFT can be selected from Au, Ag, Cu or alloys thereof. The non-magnetic, non-plasmonic layer can be a laminated structure. The non-magnetic, non-plasmonic layer can be wrapped around the magnetic pole material. The magnetic pole material might include, for example, Co, Fe, and Ni, or alloys containing Co, Fe and/or Ni.

In some embodiments, NFTs may include silver (Ag) and at least one other element or compound. The at least one other element or compound can exist within an alloy of the silver, or can be within the silver but not in the form of an alloy, for example as a nanoparticle. In some embodiments, disclosed NFTs may include a silver (Ag) alloy. The use of silver alloys may be advantageous because pure silver has better optical properties than other plasmonic materials, for example gold (Au). This could allow for more aggressive methods of material engineering without obtaining a material with useless optical properties. Silver may also have the advantage, with respect to gold, of costing less.

Useful silver alloys may include one or more than one (at least one) secondary element. Exemplary secondary elements can include, for example copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof. In some embodiments, a NFT can include a silver alloy that includes copper, palladium, or combinations thereof. In some embodiments, a NFT can include a silver alloy that includes palladium. In some embodiments a NFT can include a silver alloy that includes both palladium and copper. In some embodiments, secondary elements such as copper, zirconium, zirconium oxide, platinum, aluminum, or gold may improve the corrosion resistance of Ag. Such alloys could have better environmental stability which can in turn improve the reliability of the NFT against possible acidic environments, which can be formed by decomposition of lubricants on the magnetic medium disk surface. Such secondary elements (those that improve corrosion resistance) can either be used as a second element in the alloy, or a third element in the alloy.

In some embodiments, a NFT can include silver that includes nanoparticles of a secondary element (or compound) instead of an alloy of silver with a secondary element. Exemplary materials that can be utilized in such embodiments can include for example oxides of V, Zr, Mg, calcium (Ca), Al, Ti, Si, cesium (Ce), yttrium (Y), Ta, W or thorium (Th), Co, or combinations thereof. Further exemplary materials that can be utilized in such embodiments can include for example nitrides of Ta, Al, Ti, Si, indium (In), Fe, Zr, Cu, W, boron (B), halfnium (Hf), or combinations thereof. In some embodiments, nanoparticles can be 5 nanometers (nm) or less in diameter. In some embodiments, the nanoparticles can be included at a level that is not greater than 5 atomic percent (at %) of the silver. A nanoparticle containing silver material can be fabricated using known methods, including for example reactive sputtering. For example, an Au film with oxide or nitride particles can be fabricating using either reactive co-sputtering in $O_2$ or $N_2$ from multiple targets of single elements or from reactive sputtering in $O_2$ or $N_2$ from a single target with the desired metal element mixing ratio.

Alloys useful in disclosed NFTs can be described by, for example, the atomic percent (at %) of the at least one secondary element. In some embodiments, a useful alloy can have from 3 at % to 30 at % of the at least one secondary element. In some embodiments, a useful alloy can have from 5 at % to 25 at % of the at least one secondary element. In some embodiments, a useful alloy can have from 5 at % to 15 at % of the at least one secondary element.

Silver alloys for use in disclosed NFTs can be fabricated using various methods, including for example sputtering from an alloy target; co-sputtering from multiple targets; reactive sputtering from an alloy target; reactive co-sputtering from multiple targets; co-evaporation from multiple sources; reactive co-evaporation from multiple sources; ion beam deposition from an alloy target; and electrochemical deposition.

A number of material properties may be useful in determining whether a particular alloy could be useful, and/or perhaps advantageous for use in a NFT. Such properties can include, for example plastic deformation, grain growth, stress relaxation and creep. Some of these properties have also been identified as the cause of various NFT failures. In some embodiments, silver alloys that can be useful in disclosed NFTs can show relatively high resistance to grain growth, relatively high resistance to stress relaxation, enhanced hardness, high thermal conductivity, improved corrosion resistance, or some combination thereof.

In some embodiments, useful NFT materials can have optical properties that enable efficient coupling of incident light to the surface plasmons and effective energy transfer to the magnetic medium. The optical properties of NFT materials are often characterized by their optical refractive index (n) and extinction coefficient (k) which can be measured by ellipsometry. From the n and k values, the real and imaginary part of the dielectric constant (permittivity) can be calculated by: $\in_1 = n^2 - k^2$ and $\in_2 = 2nk$. The plasmonic effect arises from the negative real part of the dielectric constant of the material. The strength of plasmonic coupling depends on the absolute value of $\in_1$. On the other hand, the surface plasmon mode needs to propagate over a substantial distance. The loss of this propagation is proportional to the imaginary part of the dielectric $\in_2$. A good plasmonic material will have high $|\in_1|$ and low $\in_2$. Hence a figure-of-merit (FOM) has been developed to characterize the "goodness" of plasmonic materials: $FOM=3*|\in_1/\in_2|$.

The property of grain growth can be relevant to the ability of an alloy to function in a NFT. One of the sources for Ag deformation is its significant grain growth at high temperatures. By alloying Ag with other soluble metal atoms, the grain size of the Ag alloy can be reduced and the grain growth can be impeded. It is thought, but not relied upon that impeding grain growth can be the result of: a larger area of grain boundary that restrains the dislocation movement; and the localized strain fields by impurities that hinder the dislocation motion.

Thermal conductivity of an alloy can also be relevant to the ability of an alloy to function in a NFT. Silver (Ag) is known to have the highest thermal conductivity of all the metals. High thermal conductivity can be an important property for NFT materials since it may allow for effective heat transfer to an adjacent heat sink layer in order to reduce the temperature of the NFT during operation. Lower operating temperature of an NFT can provide a better environment for both the NFT material and the dielectric cladding materials, and may improve the long-term reliability of a HAMR head.

Corrosion resistance of a material may also be relevant to the ability of an alloy to function in a NFT. AgPd films can display much better environmental corrosion and/or tarnish resistance than a pure Ag film. An Ag film usually exhibits a less shiny surface after a few days in an atmospheric environment, while AgPd films do not show any degradation of surface reflectivity in air even after a few months.

The present disclosure is illustrated by the following examples. It is to be understood that the particular examples, assumptions, modeling, and procedures are to be interpreted broadly in accordance with the scope and spirit of the invention as set forth herein.

EXAMPLES

Example 1

Grain Stability of Ag Alloys

FIGS. 14A-14F show atomic force microscopy (AFM) images of films (scan size is 1 µm×1 µm). The films were deposited by DC magnetron sputtering. FIG. 14A is an as-deposited Ag film; FIG. 14B is an as-deposited AgPd (10.7 at % Pd) film; FIG. 14C is an as-deposited AgPd (25 at %) film; FIG. 14D is a Ag film after a 300° C. 15 minute rapid thermal annealing (RTA); FIG. 14E is a AgPd (10.7 at %) film after a 300° C. 15 minute rapid thermal annealing (RTA); and FIG. 14F is a AgPd (25 at %) film after a 300° C. 15 minute rapid thermal annealing (RTA). As seen in the figures, the as-deposited Ag film displays a large average grain size of about 150 nm, while AgPd films show a low average grain size of about 60 nm (FIGS. 14A, 14B, and 14C). After annealing the films at 300° C. for about 15 minutes, the average grain size of the Ag film increases significantly to about 300 nm while the AgPd films only show moderate grain growth (FIGS. 14D, 14E, and 14F). The figures show that increasing the Pd concentration in an AgPd alloy can improve its resistance to grain growth.

Example 2

Resistance of Ag to Plastic Deformation and Creep

The mechanical stability of silver upon annealing was tested by stress relaxation measurements where the thin film material was thermally cycled from room temperature to about 400° C. and back to room temperature. A Ag film was sputtered on a silicon (Si) substrate. As the film was heated up, the temperature was held at various setpoints, (for example about 100° C., about 150° C., about 200° C., about 250° C., and about 400° C.) for about 90 minutes and relative stress measurements were performed during this holding period at intervals of about 1 minute.

Figure 15A:
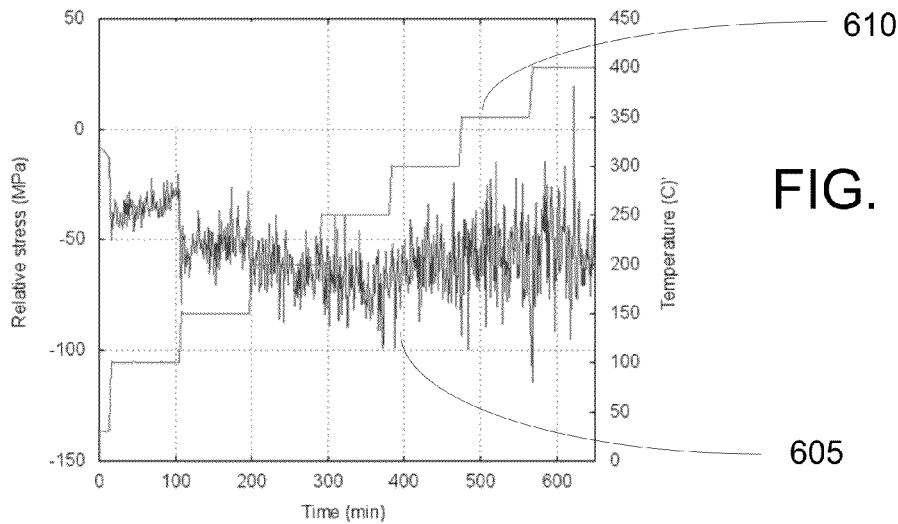
FIG. 15A shows a stress relaxation measurement of a silver (Ag) film versus time, as temperature increases from room temperature to about 400° C.

FIG. 15A shows the stress measurement as a function of time on the Ag film. The curve indicated as 605 in FIG. 15A is the relative stress of the Ag film and the curve indicated as 610 represents the temperature at each holding period. Due to different coefficients of thermal expansion of the substrate and the film, compressive stress developed in the Ag film when it was heated up. This is indicated by the negative stress relative to the stress at room temperature (seen in FIG. 15A). The initial drop of stress at the beginning of the temperature holding period and subsequent increase of stress as the holding time increases indicates a stress relaxation process in the film which is associated with creeping or plastic deformation of the material.

Figure 15B:
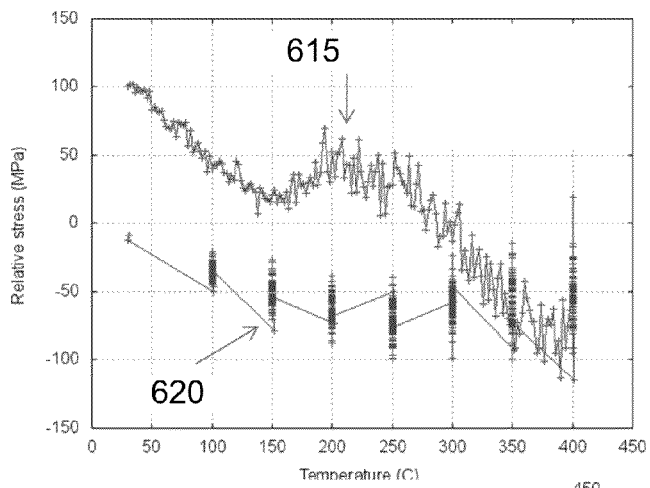
FIG. 15B shows a stress relaxation measurement of a silver (Ag) film versus temperature for both heating up and cooling down steps.

FIG. 15B shows the stress measurement as a function of temperature for both the heating up 620 and the cooling down 615 steps. A hysteretic behavior is seen between the heating and cooling curves in FIG. 15B, which further indicates plastic deformation in the Ag film.

Figure 15C:
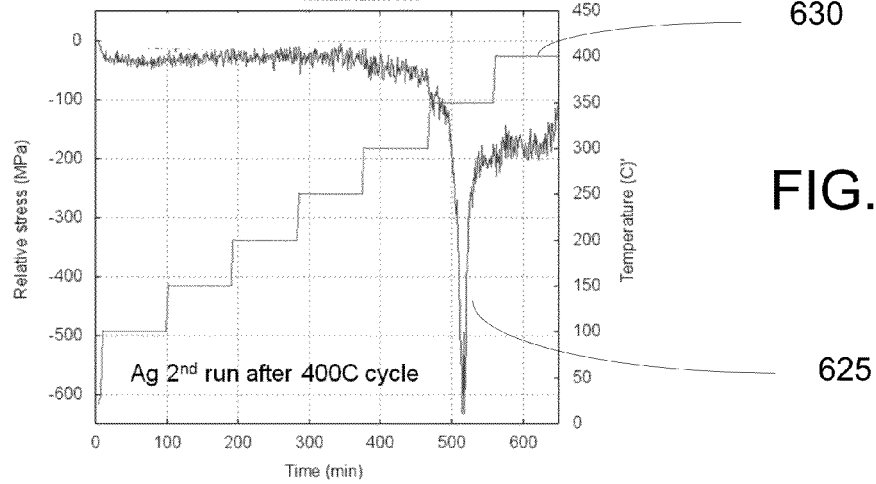
FIG. 15C shows a stress relaxation measurement of the same silver (Ag) film as FIG. 15A versus time, as temperature increases from room temperature to about 400° C. being run a second time.
Figure 15D:
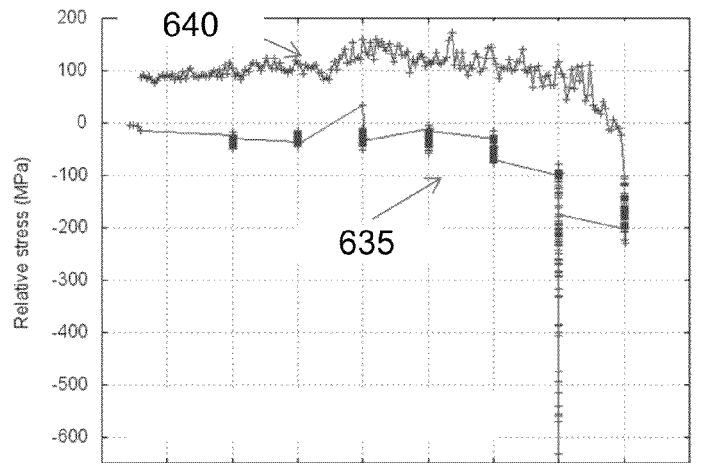
FIG. 15D shows a stress relaxation measurement of the same silver (Ag) film versus temperature for both heating up and cooling down steps being run a second time.

FIGS. 15C and 15D show the results of stress relaxation measurements on the same film for the second run. The curve indicated as 625 in FIG. 15C is the relative stress of the Ag film and the curve indicated as 630 represents the temperature at each holding period. FIG. 15D shows the stress measurement as a function of temperature for both the heating up 635 and the cooling down 640 steps. Because of the pre-annealing effect of the first measurement, the grain structure should be more stable than the as-grown film. However, even after pre-annealing up to about 400° C., the Ag film still shows similar stress relaxation as the as-grown film (FIGS. 15A and 15B), indicating plastic deformation in the film. Furthermore, a significant stress change occurred at about 350° C., suggesting chemical reaction of the film and structural change possibly due to film oxidation. As a result of grain growth, surface roughness change and chemical reaction, the Ag film after the thermal cycle showed a less shiny surface compared to its as-grown state.

Example 3

Resistance of Ag Alloys to Plastic Deformation and Creep

The mechanical stability of a AgPd film upon annealing was tested by stress relaxation measurements where the thin film material was thermally cycled from room temperature to about 400° C. and back to room temperature. A AgPd (5.8 at % Pd) film was sputtered on a silicon (Si) substrate. As the film was heated up, the temperature was held at various setpoints, (for example about 100° C., about 150° C., about 200° C., about 250° C., and about 400° C.) for about 90 minutes and relative stress measurements were performed during this holding period at intervals of about 1 minute.

Figure 16A:
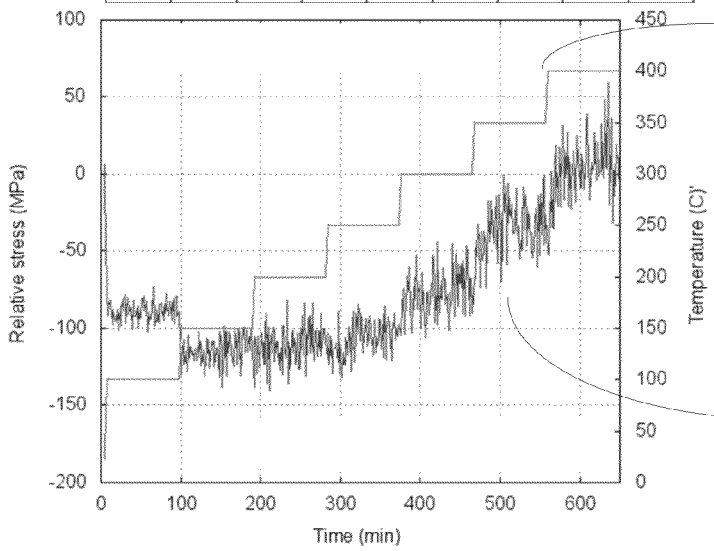
FIG. 16A shows a stress relaxation measurement of a AgPd film versus time, as temperature increases from room temperature to about 400° C.
Figure 16B:
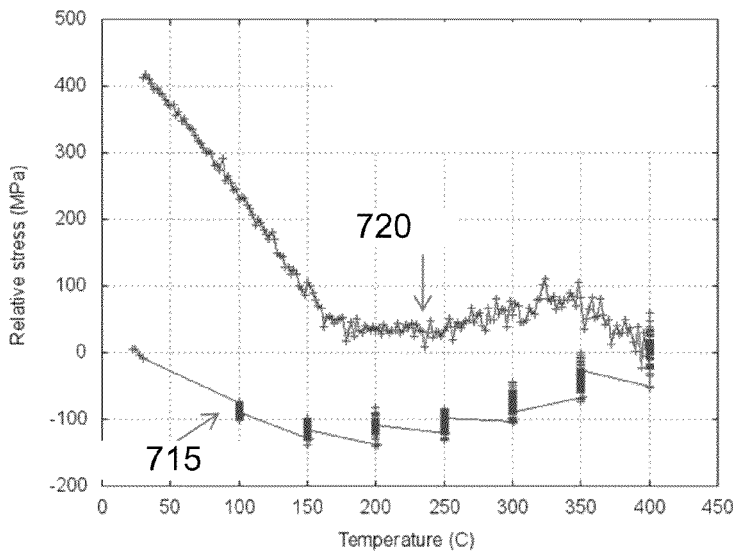
FIG. 16B shows a stress relaxation measurement of a AgPd film versus temperature for both heating up and cooling down steps.

FIG. 16A shows the stress measurement as a function of time on the AgPd film. FIG. 16A shows stress relaxation measurements of the AgPd (5.8 at % Pd) film versus time as the film is thermally cycled from room temperature to about 400° C. and back to room temperature. The curve indicated as 705 in FIG. 16A is the relative stress of the AgPd film and the curve indicated as 710 represents the temperature at each holding period. The stress relaxation does not happen until about 250° C., indicating improved resistance (relative to the Ag film) to plastic deformation. However, plastic deformation still occurred at an elevated temperature, as shown by the hysteretic curve of heating up 715 and cooling down 720 curve in FIG. 16B.

Figure 16C:
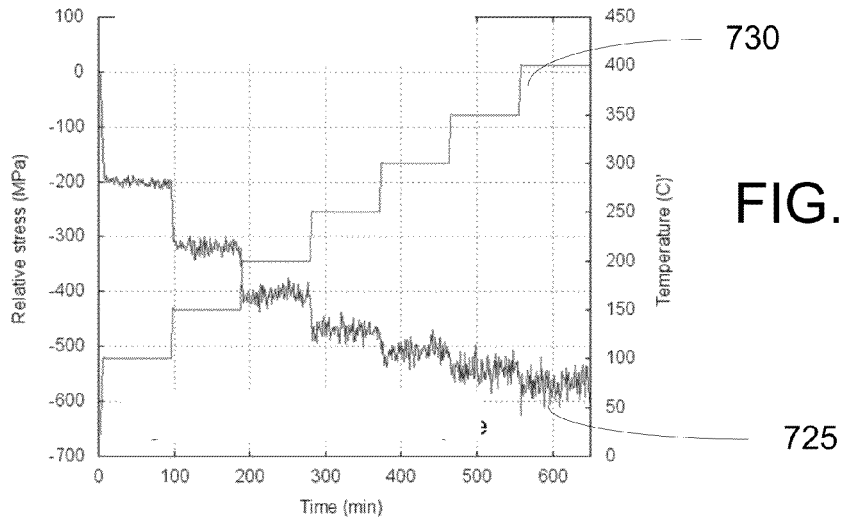
FIG. 16C shows a stress relaxation measurement of the same AgPd film as FIG. 15A versus time, as temperature increases from room temperature to about 400° C. being run a second time.
Figure 16D:
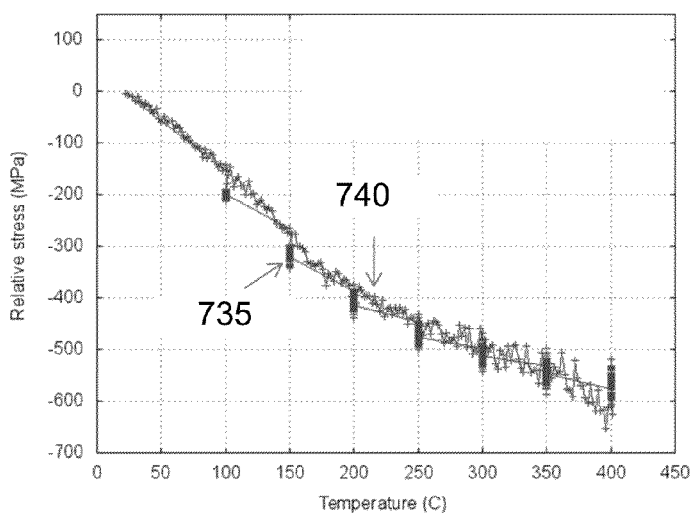
FIG. 16D shows a stress relaxation measurement of the same AgPd film versus temperature for both heating up and cooling down steps being run a second time.

FIGS. 16C and 16D show the results of stress relaxation measurements on the same film for the second run. The curve indicated as 725 in FIG. 16C is the relative stress of the Ag film and the curve indicated as 730 represents the temperature at each holding period. FIG. 16D shows the stress measurement as a function of temperature for both the heating up 735 and the cooling down 740 steps. When the AgPd film is subject to the second thermal cycle, the film shows much improved stability to creep and plastic deformation. FIGS. 16C and 16D show the results of stress relaxation measurement on the same AgPd film for the second run. Because of the pre-annealing effect of the first measurement, the AgPd film shows a more stable film structure in the second thermal cycle. The stress level is maintained for each temperature holding period as shown in FIG. 16C. The heating-up curve and cooling-down curves in FIG. 16D also overlap with a reversible stress change, which further demonstrates an enhanced resistance to creep and plastic deformation of the AgPd film after the pre-annealing treatment.

Example 4

Hardness of Ag Alloys

Figure 17:
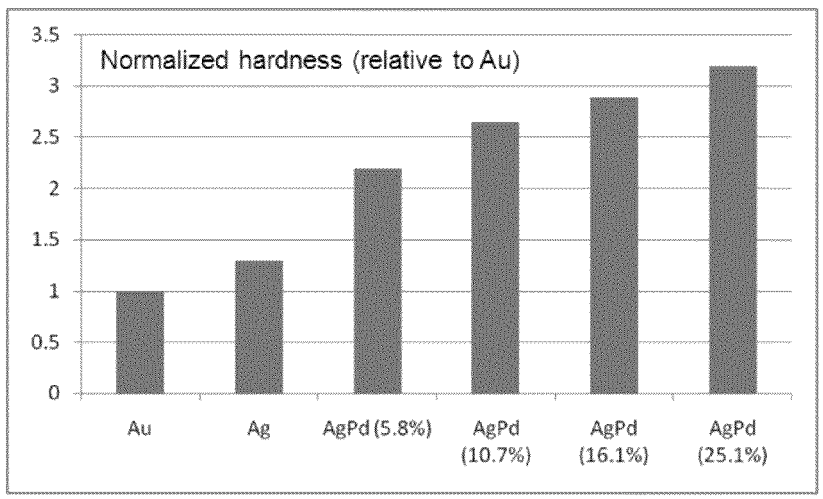
FIG. 17 shows the hardness of various films normalized to a gold (Au) film.

The hardness of various 150 nm films that were sputtered from two single element targets (Au, Ag, AgPd (5.8 at % Pd), AgPd (10.7 at % Pd), AgPd (16.1 at % Pd), and AgPd (25.1 at % Pd)) were tested using a nanoindentation technique. FIG. 17 shows the hardness of the films normalized to the Au film.

FIG. 17 shows two- or three-fold increased hardness for AgPd alloys depending on the Pd concentration relative to Au. Increasing the amount of Pd, for example, can increase the hardness proportionally. Materials with higher hardness can be more resistant to plastic deformation and can have better long-term reliability.

Example 5

Optical Properties of Ag Alloys

Figure 18A:
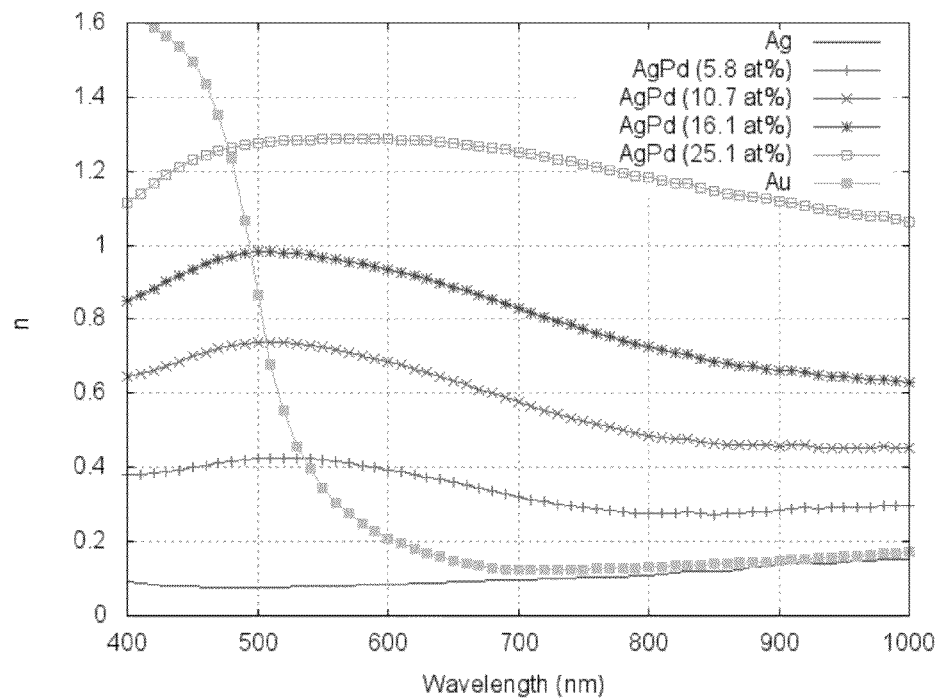
FIG. 18A shows the refractive index (n) of various materials as function of wavelength.
Figure 18B:
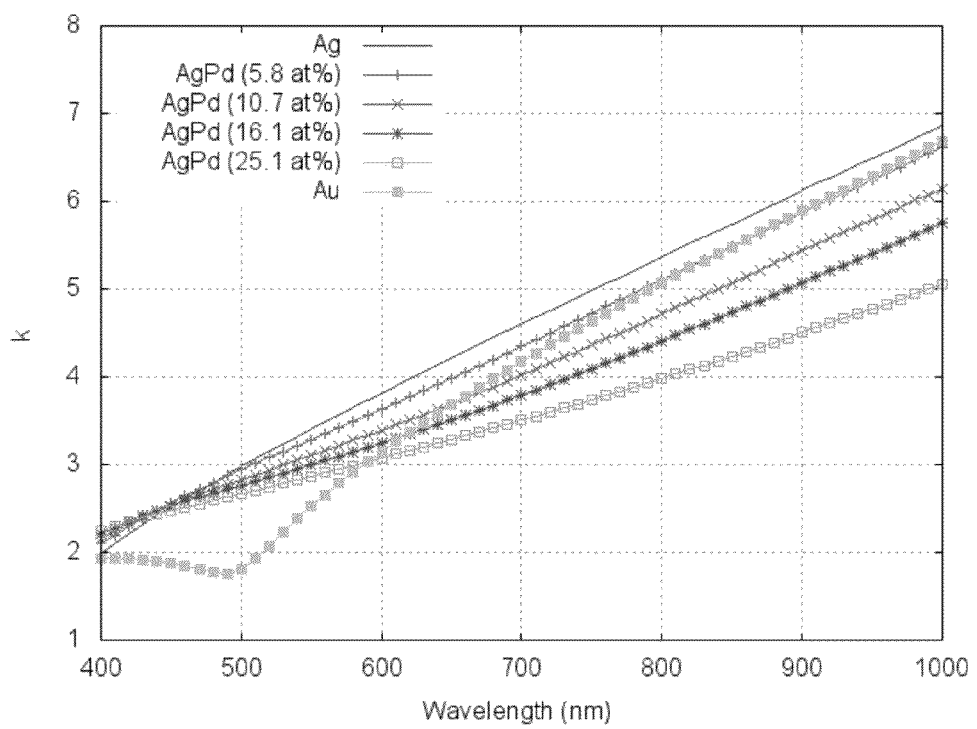
FIG. 18B shows the extinction coefficient (k) of various materials as function of wavelength.
Figure 18C:
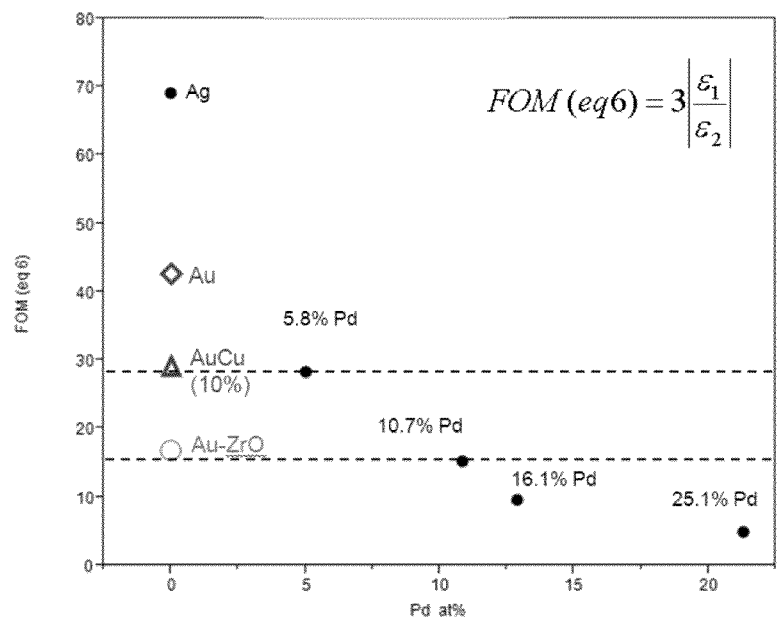
FIG. 18C shows the FOM (FOM=$3*|\in_1/\in_2|$, where $\in_1 = n^2 - k^2$ and $\in_2 = 2nk$) of various materials as function of wavelength.

FIG. 18A shows the refractive index (n) of various materials as function of wavelength, as measured with ellipsometry. Ag and Au showed the lowest values of n for wavelengths above about 700 nm. The n value of AgPd alloys show monotonic increases as the Pd concentration increases. FIG. 18B shows the extinction coefficient (k) of various materials as function of wavelength, measured with ellipsometry. The k value of AgPd alloys however, decrease monotonically with Pd concentration. FIG. 18C shows a comparison of the FOM (FOM=$3*|\in_1/\in_2|$, where $\in_1=n^2-k^2$ and $\in_2=2nk$) for various materials (some are shown for comparison—Ag, Au, AuCu, and Au—ZrO). As seen there, Ag has the best optical properties for surface plasmon resonance, followed by Au, and followed by the AgPd alloys.

Example 6

Thermal Conductivity of Ag Alloys

Figure 19:
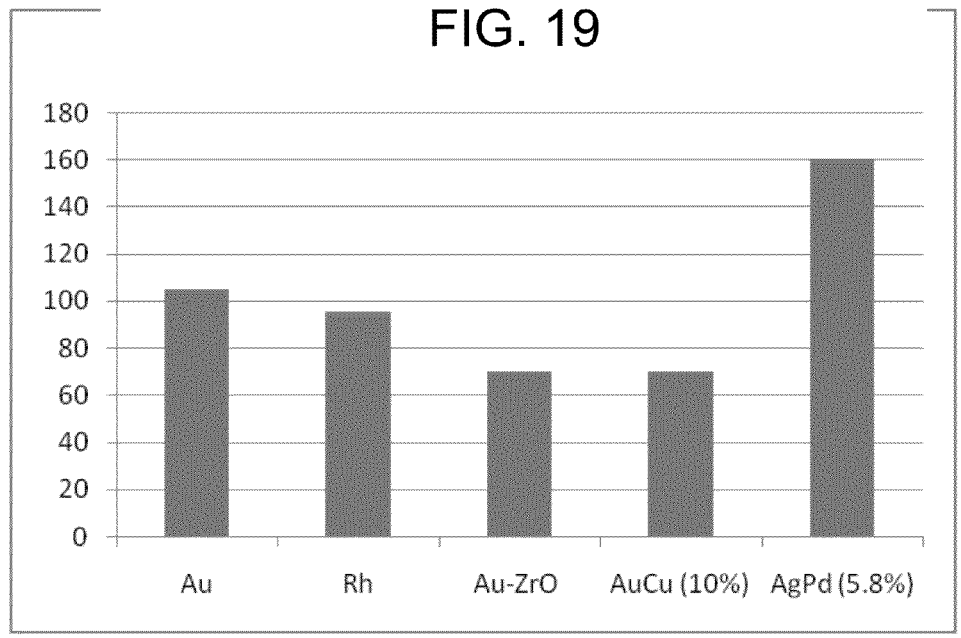
FIG. 19 shows the thermal conductivity (W/mK) of various materials.

FIG. 19 shows the thermal conductivity of a 100 nm thick film of AgPd (5.8 at % Pd) in comparison with other materials. AgPd (5.8 at % Pd) has the highest thermal conductivity, 160 W/m-k.

Example 7

Corrosion Resistance of Ag Alloys

To quantify the corrosion resistance of AgPd in solution, an electrochemical corrosion experiment was performed on AgPd films. The corrosion potentials ($E_{corr}$) and corrosion current densities ($I_{corr}$) were determined from potentiodynamic scans. An area of 1 cm² of film was exposed to NaCl 0.1M at pH 3 or 5.9 using a Princeton Applied Research Flat Cell. A Gamy potentiostat was used with the film. The working electrode was a saturated calomel (SCE) reference electrode, and the counter electrode was a Pt mesh. The scans were done at 1 mV/sec in the positive direction from –0.2V versus the open circuit potentials that were established by equilibrating the 1 cm² area of the films with NaCl 0.1M at pH 5.9 for 1200 sec or NaCl 0.1M at pH 3 for 300 sec before the scans. Table I shows the corrosion potential and corrosion current density comparison of Ag, AgPd (5.8 at % Pd) and AgPd (10.7 at % Pd) films in NaCl solutions at the two different pHs.

TABLE I

| Material | $E_{corr}$ (V vs. SCE) | $I_{corr}$ ($\mu$A/cm²) |
|---|---|---|
| NaCl 0.1M pH + 5.9 | | |
| Ag | –0.054 | 0.09 |
| AgPd (5 at % Pd) | –0.06 | 0.05 |
| AgPd (10 at % Pd) | –0.056 | 0.03 |

TABLE I-continued

| Material | $E_{corr}$ (V vs. SCE) | $I_{corr}$ ($\mu$A/cm²) |
|---|---|---|
| NaCl 0.1M pH = 3 | | |
| Ag | –0.072 | 0.073 |
| AgPd (5 at % Pd) | –0.054 | 0.054 |
| AgPd (10 at % Pd) | –0.03 | 0.025 |

As seen in Table I, in a pH of 5.9, the corrosion potentials are approximately the same. As the Pd content increases the corrosion current densities (corrosion rates) decrease. In a pH of 3, the corrosion potential slightly increases as the Pd content increases, the corrosion density is also seen to decrease with Pd concentration. Table II shows the Electrochemical Impedance Spectroscopy (EIS) scan of Ag and AgPd alloys in a NaCl solution having a pH=5.9. The test was done at the corrosion potential of each material. A much higher impedance was seen in AgPd alloys, which indicates better corrosion resistance for AgPd alloy.

TABLE II

| Material | Rp (M Ohm cm²) |
|---|---|
| Ag | 0.24 |
| AgPd (5 at % Pd) | 1.2 |
| AgPd (10 at % Pd) | 2.1 |

It was found that although the current densities (corrosion rates) of Ag film are low, the Ag films tarnished after the corrosion test. In the case of AgPd, the films showed better resistance to the corrosion test. AgPd (5.8 at % Pd) showed some degree of tarnishing while AgPd (10.7 at % Pd) was still very shiny after the corrosion test. This further demonstrated the improved corrosion resistance and environmental stability of AgPd films compared to pure Ag films.

Thus, embodiments of recording heads including NFT and heatsink are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:
1. An apparatus comprising:
a near field transducer positioned adjacent to an air bearing surface, the near field transducer comprising silver (Ag) and at least one other element or compound, wherein the at least one other element or compound is selected from:
copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof;
oxides of V, Zr, Mg, calcium (Ca), Al, Ti, Si, cesium (Ce), yttrium (Y), Ta, W or thorium (Th), Co, or combinations thereof; or
nitrides of Ta, Al, Ti, Si, indium (In), Fe, Zr, Cu, W, boron (B), halfnium (Hf), or combinations thereof;
a first magnetic pole; and
a heat sink positioned between the first magnetic pole and the near field transducer, wherein the heat sink comprises:

rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

2. The apparatus according to claim 1, wherein the heat sink provides a diffusion barrier between the near field transducer and the first magnetic pole.

3. The apparatus according to claim 1, wherein the heat sink comprises Rh, W, or TiN.

4. The apparatus according to claim 1, wherein the first magnetic pole comprises one of: Co, Fe, Ni, or alloys containing Co, Fe, and/or Ni.

5. The apparatus according to claim 1, wherein the near field transducer comprises an antenna.

6. The apparatus according to claim 1, wherein the heat sink has a bilayer structure.

7. The apparatus according to claim 1, wherein the near field transducer comprises an alloy of silver (Ag) and at least one of copper (Cu) or palladium (Pd).

8. The apparatus according to claim 1, wherein the alloy comprises about 5 atomic percent to about 15 atomic percent of the at least one secondary element.

9. An apparatus comprising:
a near field transducer positioned adjacent to an air bearing surface of the apparatus the near field transducer comprising silver (Ag) and at least one other element or compound, wherein the at least one other element or compound is selected from:
copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof;
oxides of V, Zr, Mg, calcium (Ca), Al, Ti, Si, cesium (Ce), yttrium (Y), Ta, W or thorium (Th), Co, or combinations thereof; or
nitrides of Ta, Al, Ti, Si, indium (In), Fe, Zr, Cu, W, boron (B), halfnium (Hf), or combinations thereof, and
wherein the near field transducer comprises a disk and a peg, wherein the peg extends from the disk portion to the air bearing surface of the apparatus;
a first magnetic pole;
a heat sink positioned between the first magnetic pole and the near field transducer; and
a diffusion barrier positioned between the near field transducer and the heat sink, the diffusion barrier comprising rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

10. The apparatus according to claim 9, wherein the diffusion barrier is positioned between the disk portion of the NFT and the heat sink.

11. The apparatus according to claim 9, wherein the heat sink comprises Rh, W, or TiN.

12. The apparatus according to claim 9, wherein the near field transducer comprises an alloy of silver (Ag) and at least one of copper (Cu) or palladium (Pd).

13. The apparatus according to claim 9, wherein the alloy comprises about 5 atomic percent to about 15 atomic percent of the at least one secondary element.

14. An apparatus comprising:
a near field transducer positioned adjacent to an air bearing surface, near field transducer comprising silver (Ag) and at least one other element or compound, wherein the at least one other element or compound is selected from:
copper (Cu), palladium (Pd), gold (Au), zirconium (Zr), platinum (Pt), geranium (Ge), nickel (Ni), tungsten (W), cobalt (Co), rhodium (Rh), ruthenium (Ru), tantalum (Ta), chromium (Cr), aluminum (Al), vanadium (V), iridium (Ir), titanium (Ti), magnesium (Mg), iron (Fe), molybdenum (Mo), silicon (Si), or combinations thereof;
oxides of V, Zr, Mg, calcium (Ca), Al, Ti, Si, cesium (Ce), yttrium (Y), Ta, W or thorium (Th), Co, or combinations thereof; or
nitrides of Ta, Al, Ti, Si, indium (In), Fe, Zr, Cu, W, boron (B), halfnium (Hf), or combinations thereof, and
wherein the near field transducer comprises an antenna;
a first magnetic pole;
a heat sink positioned between the first magnetic pole and the near field transducer; and
a diffusion barrier positioned between the near field transducer and the first magnetic pole, the diffusion barrier comprising rhodium (Rh) or an alloy thereof; ruthenium (Ru) or an alloy thereof; titanium (Ti) or an alloy thereof; tantalum (Ta) or an alloy thereof; tungsten (W) or an alloy thereof; borides; nitrides; transition metal oxides; or palladium (Pd) or an alloy thereof.

15. The apparatus according to claim 14, wherein the diffusion barrier is spaced from the air bearing surface.

16. The apparatus according to 14, wherein the diffusion barrier comprises a multilayer structure.

17. The apparatus according to claim 14, wherein the diffusion barrier comprises Rh, W, or TiN.

18. The apparatus according to claim 14, wherein the diffusion barrier comprises a nitride.

19. The apparatus according to claim 14, wherein the near field transducer comprises an alloy of silver (Ag) and at least one of copper (Cu) or palladium (Pd).

20. The apparatus according to claim 14, wherein the alloy comprises about 5 atomic percent to about 15 atomic percent of the at least one secondary element.

* * * * *

UNITED STATES PATENT AND TRADEMARK OFFICE
CERTIFICATE OF CORRECTION

PATENT NO. : 8,934,198 B2  
APPLICATION NO. : 14/062651  
DATED : January 13, 2015  
INVENTOR(S) : Jie Zou et al.

It is certified that error appears in the above-identified patent and that said Letters Patent is hereby corrected as shown below:

On the title page item (72) Inventors, line five, please delete "Vankateswara" and insert --Venkateswara--.

Signed and Sealed this
Twenty-eighth Day of April, 2015

Michelle K. Lee
*Director of the United States Patent and Trademark Office*